US012805457B2

(12) United States Patent
Dillon et al.

(10) Patent No.: US 12,805,457 B2
(45) Date of Patent: Nov. 24, 2026

(54) ROLL FORMED BEAM ASSEMBLY FOR LIGHTWEIGHT FIELD IRRIGATION APPARATUS

(71) Applicant: Valmont Industries, Inc., Omaha, NE (US)

(72) Inventors: Cory J. Dillon, Bennington, NE (US); John A. Kastl, Wahoo, NE (US); Steven C. Santelman, Elkhorn, NE (US)

(73) Assignee: Valmont Industries, Inc., Omaha, NE (US)

( * ) Notice: Subject to any disclaimer, the term of this patent is extended or adjusted under 35 U.S.C. 154(b) by 183 days.

(21) Appl. No.: 18/659,691

(22) Filed: May 9, 2024

(65) Prior Publication Data

US 2024/0284840 A1 Aug. 29, 2024

Related U.S. Application Data

(63) Continuation-in-part of application No. 18/456,562, filed on Aug. 28, 2023.

(60) Provisional application No. 63/403,012, filed on Sep. 1, 2022.

(51) Int. Cl.
*A01G 25/09* (2006.01)

(52) U.S. Cl.
CPC .................................. *A01G 25/092* (2013.01)

(58) Field of Classification Search
CPC ...... A01G 25/092; A01G 25/16; A01G 25/02; A01G 25/097; B05B 1/20; B05B 13/005
See application file for complete search history.

(56) References Cited

U.S. PATENT DOCUMENTS

| | | | | |
|---|---|---|---|---|
| 4,090,528 | A * | 5/1978 | Hegemann | A01G 25/092 239/728 |
| 4,722,481 | A | 2/1988 | Lemkin | |
| 7,384,008 | B1 * | 6/2008 | Malsam | G01B 11/27 239/731 |
| 9,279,520 | B2 * | 3/2016 | Korus | F16L 23/0286 |
| 11,274,781 | B1 | 3/2022 | Kamerath et al. | |
| 2007/0221763 | A1 * | 9/2007 | Sieling | A01G 25/092 239/728 |
| 2016/0021835 | A1 | 1/2016 | Teeter | |
| 2021/0190241 | A1 | 6/2021 | Shoap | |
| 2021/0235640 | A1 * | 8/2021 | LeBaron | A01G 25/097 |

OTHER PUBLICATIONS

Johnson Bros. Metal Forming Co., Angles, Angle Irons & V-Shapes, accessed Dec. 22, 2025, 6 pages, https://web.archive.org/web/20060207023718/https://www.johnsonrollforming.com/display.php/display/e/category/18.

* cited by examiner

*Primary Examiner* — Christopher R Dandridge
(74) *Attorney, Agent, or Firm* — Milligan PC LLO

(57) ABSTRACT

An improved irrigation system which includes a central roll form beam assembly supporting a central hose connected between multiple connection modules. According to a preferred embodiment, the irrigation system includes multiple tower assemblies which support the central roll form beam assembly. The central hose preferably runs within a central channel and between connecting nozzles. According to further preferred embodiments, the first and second connecting nozzles preferably each include multiple arms which extend over the walls of the beam assembly to secure each connecting nozzle to the beam assembly.

15 Claims, 20 Drawing Sheets

ROLL FORMED BEAM ASSEMBLY FOR LIGHTWEIGHT FIELD IRRIGATION APPARATUS

RELATED APPLICATIONS

The present application is a Continuation-In-Part of U.S. patent application Ser. No. 18/456,562 filed Aug. 28, 2023, which claims priority to U.S. Provisional Application No. 63/403,012 filed Sep. 1, 2022.

FIELD OF THE PRESENT INVENTION

The present invention relates generally to irrigation machines and, more particularly, to a roll formed beam assembly for provisioning a lightweight field irrigation apparatus.

BACKGROUND OF THE INVENTION

Modern field irrigation machines are combinations of drive systems and sprinkler systems. Common irrigation machines most often include an overhead sprinkler irrigation system consisting of several segments of pipe (usually galvanized steel or aluminum) joined together and supported by trusses, mounted on wheeled towers with sprinklers positioned along its length. These machines move in a circular pattern (if center pivot) or linear and are fed with water from an outside source (i.e., a well or water line). The essential function of an irrigation machine is to apply an applicant (i.e., water or other solution) to a given location.

FIG. 8 illustrates a common irrigation system 1 as generally known in the prior art. As shown, the system 1 includes a center pivot structure 2 and conduits 3, 4, 5 (e.g., pipes) that carry water (or other applicants) along the length of the system 1 to sprayers 9. The sprayers 9 then disperse the water within a given area to be irrigated. The conduits 3, 4, 5 are coupled to one another and supported and moved by sets of drive towers 6, 7, 8.

A key drawback to modern irrigation machines is that they are exceptionally large and cumbersome. Additionally, these machines commonly involve numerous sub-systems which are difficult to monitor and maintain. For this reason, modern irrigation machines are severely limited in their potential uses.

In order to overcome the limitations of the prior art, a simple, lightweight irrigation machine is needed to effectively apply applicants while minimizing the costs and size of the irrigation machine.

SUMMARY OF THE DISCLOSURE

To minimize the limitations found in the prior art, and to minimize other limitations that will be apparent upon the reading of the specifications, the present invention teaches an improved irrigation system which includes a central angle iron assembly supporting a hose connected between multiple connection modules.

According to a preferred embodiment, the irrigation system preferably includes multiple tower assemblies which support the central angle iron assembly. According to preferred embodiments, the central hose preferably runs within the central angle iron and between connecting nozzles which are attached to the central angle iron assembly. According to a further preferred embodiment, the central angle iron assembly may preferably be supported between a central pivot and drive unit (and between drive units) by a variable depth truss and truss rod design as discussed further herein.

According to further preferred embodiments, the first and second connecting nozzles preferably each include multiple, laterally extending arms which extend over the walls of the central angle iron to secure each connecting nozzle to the central angle iron.

According to a further preferred embodiment, the tower assemblies preferably include front and rear legs which are formed at right angles to one another. Alternatively, larger drive assemblies/towers may be used such as tower assemblies having four legs and tower support or formed channel drive units with two legs and tower support.

According to further preferred embodiments, the present invention teaches a central roll form beam assembly supporting a central hose connected between multiple connection modules. According to a preferred embodiment, the irrigation system includes multiple tower assemblies which support the central roll form beam assembly. The central hose preferably runs within a central channel formed within the central roll form beam assembly and between connecting nozzles. According to further preferred embodiments, the first and second connecting nozzles preferably each include multiple arms which extend over the outer walls of the beam assembly to secure each connecting nozzle to the central roll form beam assembly. According to further preferred embodiments, the central roll form beam assembly of the present invention may preferably further include one or more additional lines running within the central channel of the present invention. Preferably, the one or more additional lines may include for example a span cable for providing power and communications along the central roll form beam assembly. Further, the lines may include additional lines dedicated to chemigation, fertigation, and other additional lines and tubes such as dedicated communication lines (e.g., coaxial cables, ethernet and fiber optic lines) as discussed further herein.

Other goals and advantages of the invention will be further appreciated and understood when considered in conjunction with the following description and accompanying drawings. While the following description may contain specific details describing particular embodiments of the invention, these details should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

BRIEF DESCRIPTION OF THE DRAWINGS

Elements in the figures have not necessarily been drawn to scale in order to enhance their clarity and to improve the understanding of the various elements and embodiments of the invention. Furthermore, elements that are known to be common and well understood to those in the industry are not depicted in order to provide a clear view of the various embodiments of the invention. Thus, it should be understood that the drawings are generalized in form in the interest of clarity and conciseness.

DESCRIPTION OF THE PREFERRED EMBODIMENTS

Aspects of the present invention will be explained with reference to exemplary embodiments and examples which are illustrated in the accompanying drawings. These descriptions, embodiments and figures are not to be taken as limiting the scope of the claims. Further, the word "exemplary" is used herein to mean "serving as an example, instance, or illustration." Accordingly, any embodiment described herein as "exemplary" is not to be construed as preferred over other embodiments. Additionally, well-known elements of the embodiments will not be described in detail or will be omitted so as not to obscure relevant details.

Where the specification describes advantages of an embodiment or limitations of other prior art, the applicant does not intend to disclaim or disavow any potential embodiments covered by the appended claims unless the applicant specifically states that it is "hereby disclaiming or disavowing" potential claim scope. Likewise, the term "embodiments" does not require that all embodiments of the invention include any discussed feature or advantage, nor that it does not incorporate aspects of the prior art which are sub-optimal or disadvantageous.

As used herein, the singular forms "a," "an" and "the" are intended to include the plural forms as well, unless the context clearly indicates otherwise. Additionally, the word "may" is used in a permissive sense (i.e., meaning "having the potential to'), rather than the mandatory sense (i.e., meaning "must"). Further, it should also be understood that throughout this disclosure, unless logically required to be otherwise, where a process or method is shown or described, the steps of the method may be performed in any order (i.e., repetitively, iteratively or simultaneously) and selected steps may be omitted. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

With reference now to FIGS. 1-7, the present invention teaches an improved irrigation system which includes a central angle iron assembly supporting a hose connected between multiple connection modules. As should be understood, the examples discussed herein are intended to be illustrative and any of a variety of alternative systems, embodiments and/or configurations may be used with the present invention without limitation.

Figure 1:
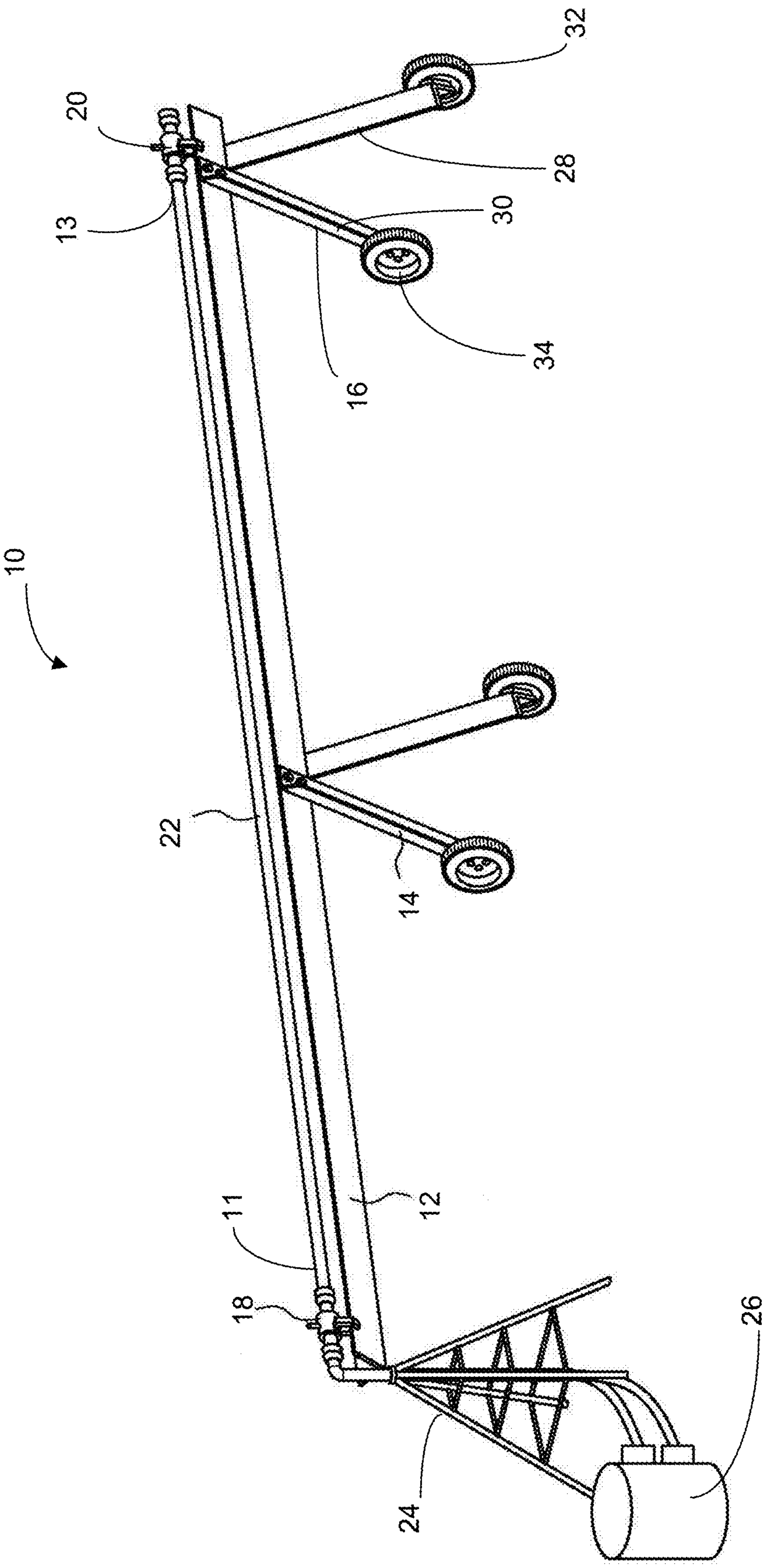
FIG. 1 shows an exemplary irrigation system in accordance with a first preferred embodiment of the present invention.

With reference now to FIG. 1, an exemplary irrigation system 10 in accordance with a first preferred embodiment of the present invention shall now be discussed. As shown in FIG. 1, the exemplary irrigation system 10 preferably includes a main hose 22 for transporting liquid from a water source 26 to one or more connecting nozzles 18, 20.

As shown, the connecting nozzles 18, 20 may preferably be supported by an angle iron assembly 12 which may include one or more angle irons which are attached together as discussed further below. As further shown, the angle iron assembly 12 is preferably supported by one or more tower assemblies 14, 16 which may preferably be used to transport the irrigation system 10 across a field to be irrigated. In FIG. 1, the main hose 22 is shown elevated above the floor of the angle iron assembly 12. According to alternative preferred embodiments, the main hose 22 may preferably run within the central channel of the angle iron assembly 12 and/or may run flush with the floor of the angle iron assembly 12.

Each tower assembly 14, 16 may preferably include a front leg 28 and a rear leg 30 which may be attached to the underside of the angle iron assembly 12 as discussed further below. Each of the front and rear legs 28, 30 may preferably also be attached to one or more wheels 32, 34. Alternatively, other tower assembly designs may be used (such as shown in FIG. 2 below) without limitation.

According to a first preferred embodiment, the angle iron assembly 12 may be attached to additional span components such as an additional angle iron assembly or the like via a ball and socket swivel design as discussed with reference to FIG. 7 below. In this way, water preferably may be transferred from a given center pivot 24 to the main hose 22 running within the angle iron sections 12 and may then extend to additional attached iron assemblies or the like. According to alternative preferred embodiments, a rotating flange, slip-ring or other swivel design may be used for transfer of electrical power and signals to a span cable to provide control signals and motive power to the drive units from the central pivot. The span cable may preferably run within the angle iron 12 or may be run outside of the angle iron 12.

According to a first preferred embodiment, the central hose 22 may be formed from HDPE tubing or the like. Alternatively, the central hose 22 may be a fabric reinforced rubber hose such as fire hose, lay-flat fiber reinforced poly hose, PVC pipe, or any type of flexible hose material. The central hose 22 may be made to any length so that each connecting nozzle 18, 20 is properly spaced. As shown, the hose assembly 22 may preferably be attached at a first end 11 to a first connecting nozzle 18 and at a second end 13 to a second connecting nozzle 20.

Figure 2:
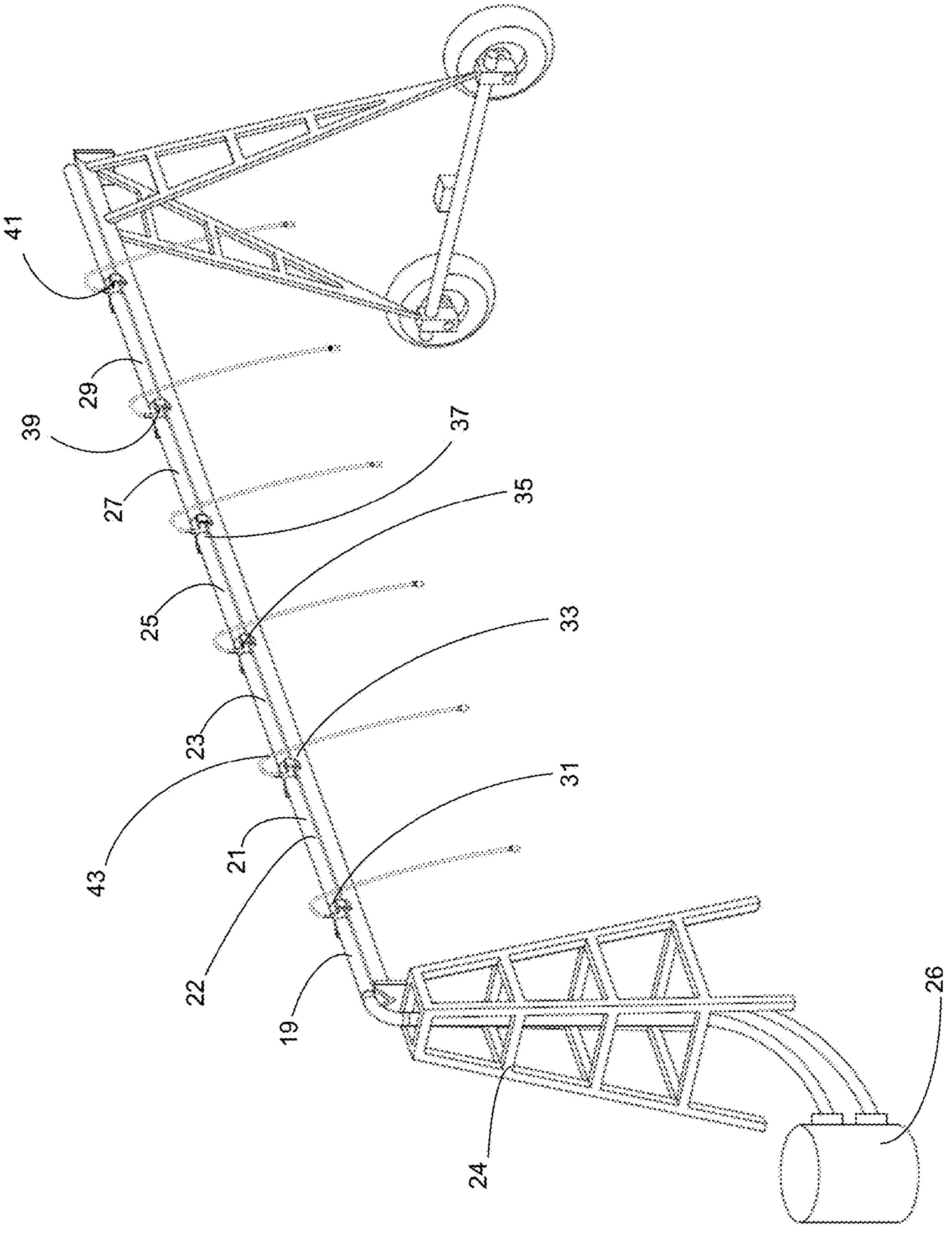
FIG. 2 shows an exemplary irrigation system in accordance with a further preferred embodiment of the present invention.

Referring now to FIG. 2, the central hose 22 may preferably be a single length of hose or may alternatively include multiple sections of hoses which are joined together. As shown in FIG. 2, the central hose 22 may preferably be cut/sized into multiple segments 19, 21, 23, 25, 27, 29 which are connected by multiple connecting nozzles 31, 33, 35, 37, 39, 41. Accordingly, connected nozzles/sprayers may preferably be provided and spaced at multiple locations along the length central hose 22 to work as sprinkler outlets. As shown, sprayers and other attachments such as drop sprinkler nozzles 43 may be attached to each connecting nozzle 31, 33, 35, 37, 39, 41. According to alternative embodiments, the spacing of the nozzles may preferably vary (e.g., 30" to 120" spacing) depending on the needs of a given crop and the spacing required in a given field based on the selection of nozzles/sprinklers and other factors.

Figure 3:
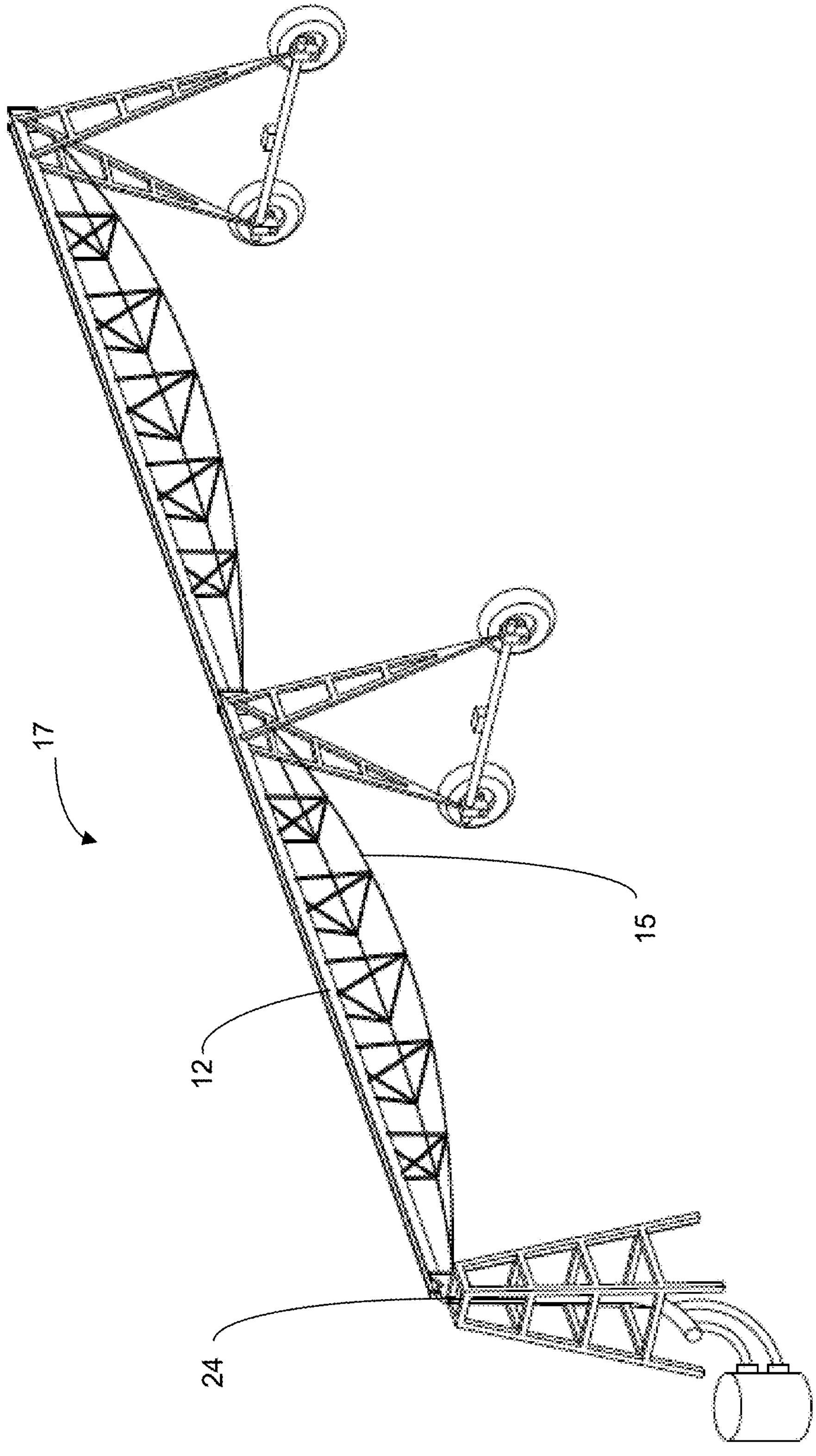
FIG. 3 shows an exemplary irrigation system in accordance with a further preferred embodiment of the present invention.
Figure 6:
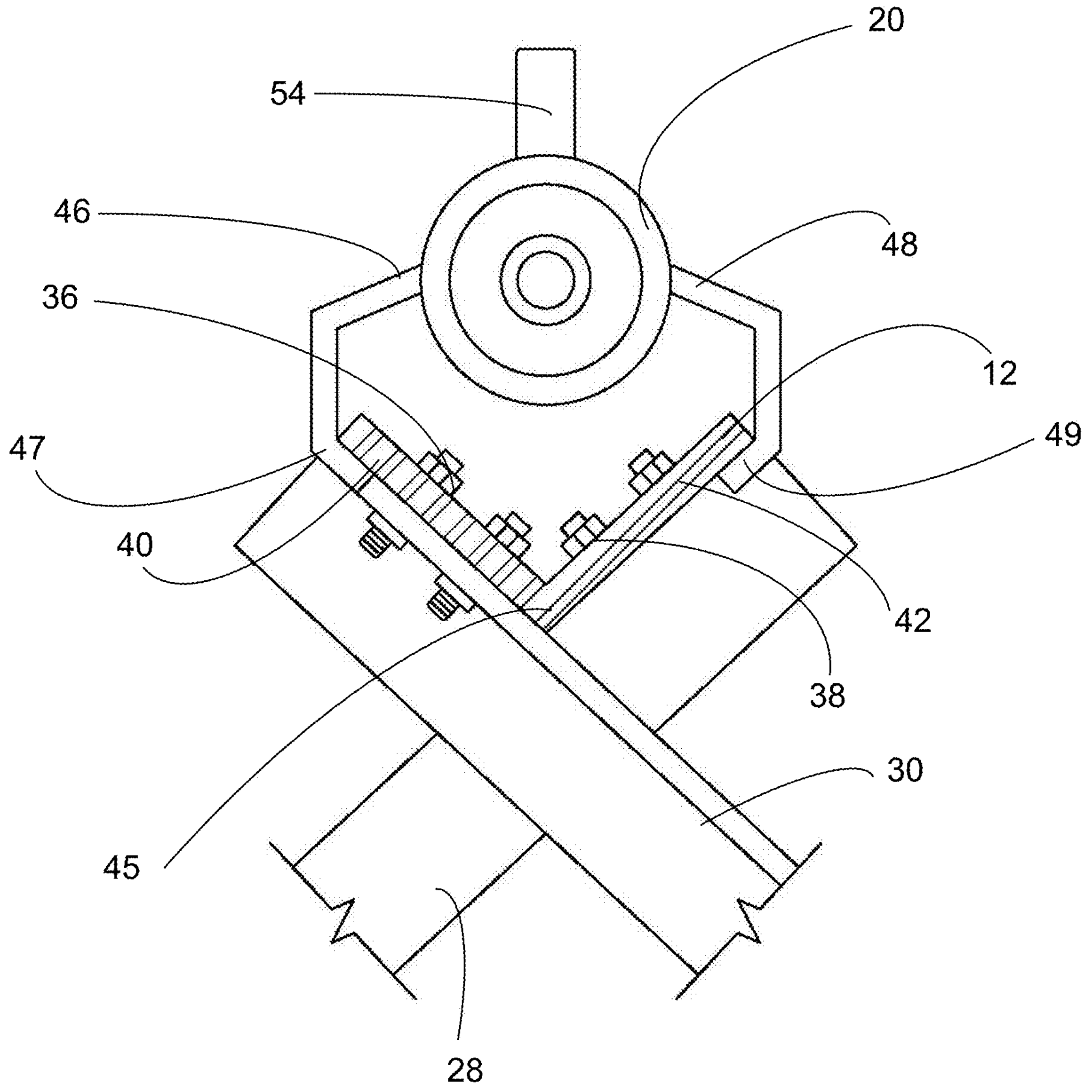
FIG. 6 shows an enlarged elevation view of a portion of the exemplary irrigation system shown in FIG. 4.

As shown in FIG. 3, according to an alternative preferred embodiment 17, the angle iron assembly 12 of the present invention may preferably be supported by an under-truss assembly 13 incorporating a truss-rod design or the like. According to further alternative embodiments, the central pivot structure 24 may be replaced by a cart or other linearly moving support. The irrigation system 10 may further include a ball and socket connection/mount (as shown in FIG. 6) or the like to allow the irrigation system 10 to be manually moved and/or towed around a given field. Such ball and socket mounts may preferably be used between each section/span of angle iron sections 12 as discussed further herein. Further, alternative drive tower supports and wheel arrangements may be used to support the angle iron assembly 12 without limitation.

Figure 4:
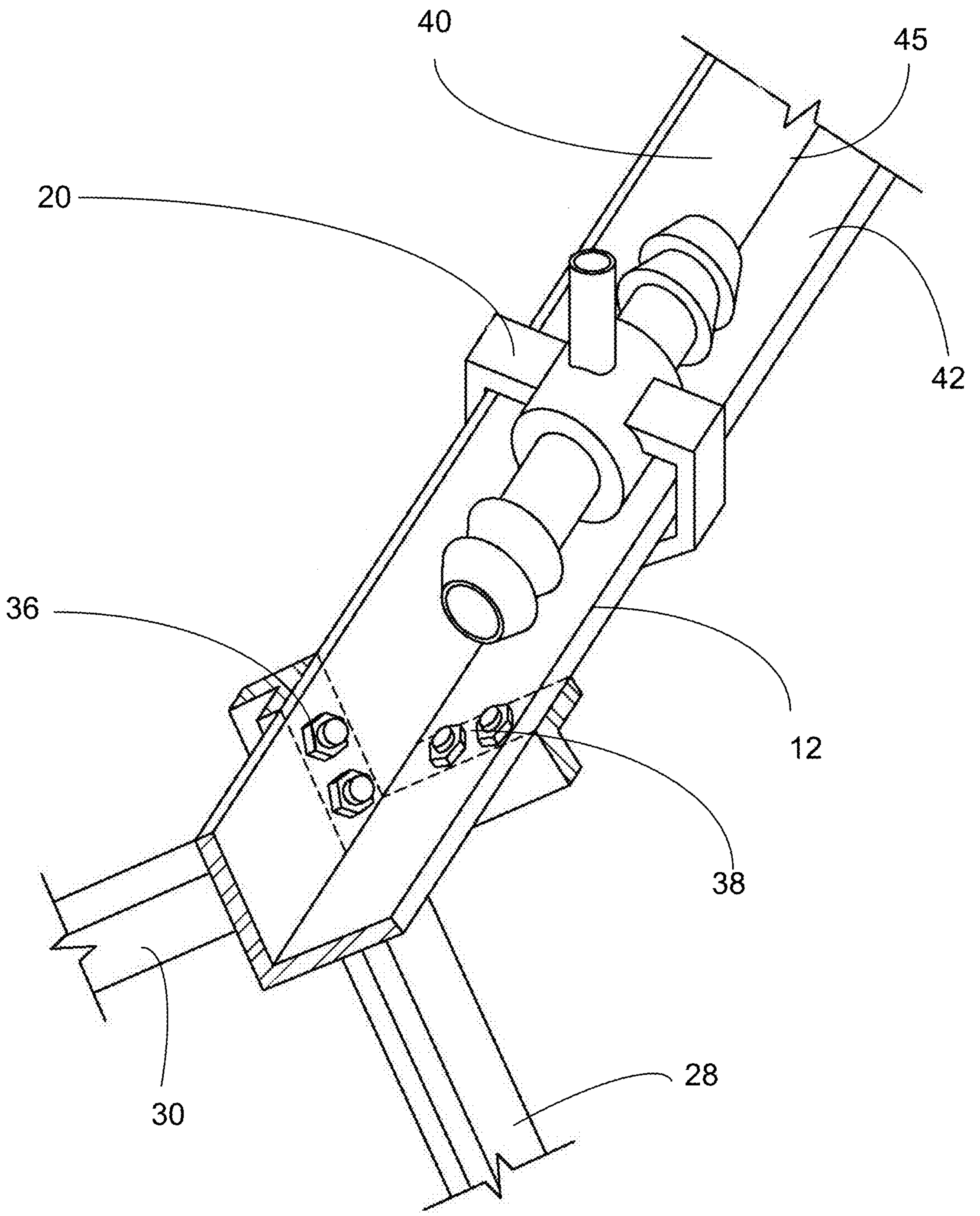
FIG. 4 shows an enlarged view of a central section of the exemplary irrigation system shown in FIG. 1.

With reference now to FIG. 4, an enlarged view of the irrigation system 10 shown in FIG. 1 is provided with the central hose 22 removed. In FIG. 4, the connecting nozzle 20 is shown connected to the angle iron 12. The angle iron 12 as shown in FIG. 3 includes a first wall 40 and a second wall 42 which are joined at a central joint 45. As shown, the first wall 40 is attached to a first leg 28 using a first set of front connecting bolts 36. Similarly, the second wall 42 may preferably be attached to a second leg 30 using a set of rear connecting bolts 38. In a similar manner, the under-truss design discussed above with respect to FIG. 3 may be attached to the angle iron 12.

Figure 5:
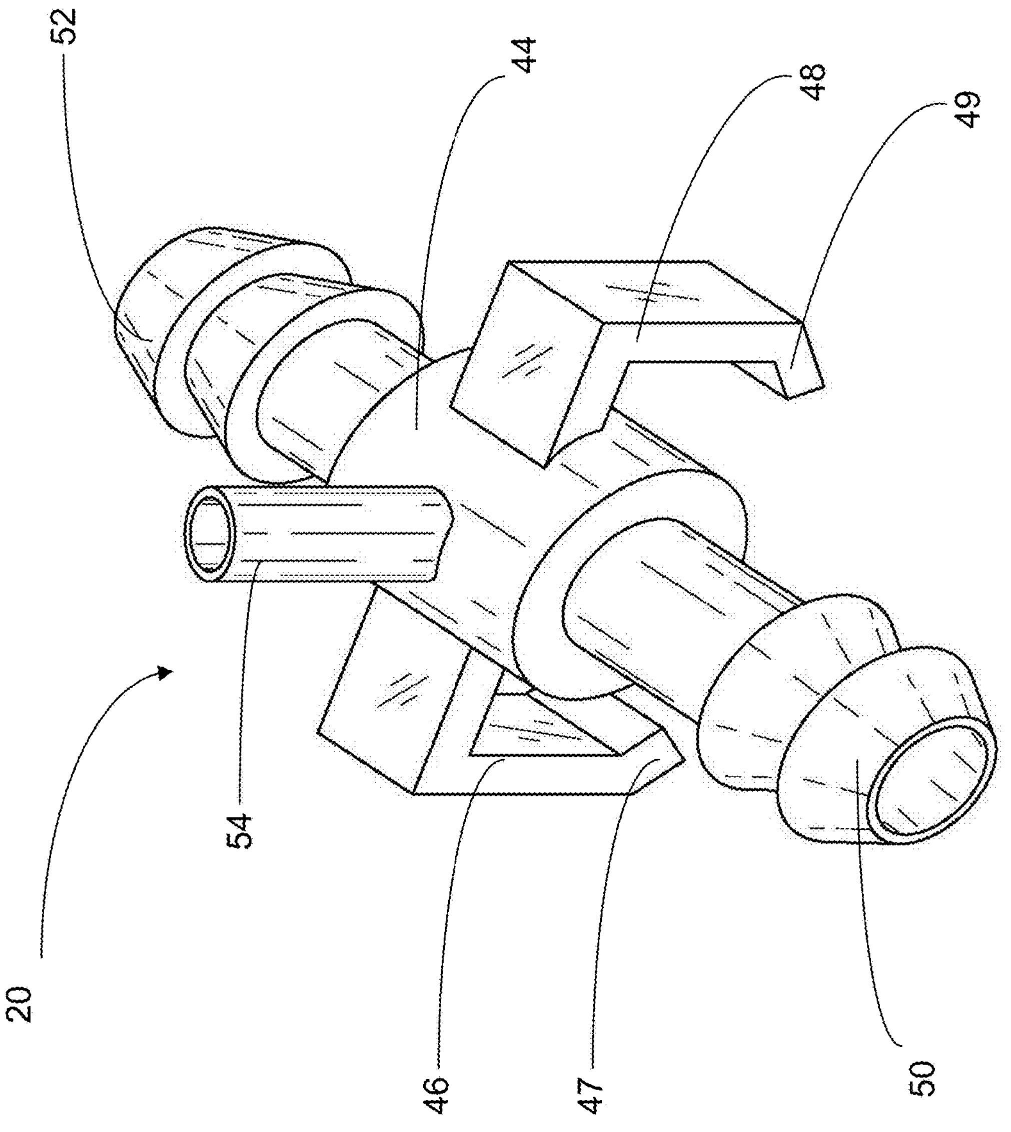
FIG. 5 shows a perspective view of an exemplary connecting nozzle assembly in accordance with a first preferred embodiment of the present invention.

With reference now to FIG. 5, an enlarged, isolated view of a detached connecting nozzle 20 is provided. The connecting nozzle 20 may preferably be formed from injected molded HDPE. Alternatively, the connection nozzle 20 may be formed of other materials such as glass reinforced nylon, aluminum, stainless steel, galvanized steel, cast iron cast brass or the like. As shown, in accordance with a first preferred embodiment the connecting module 20 may preferably include a center body portion 44 having a first arm 46 and a second arm 48. As shown, the first arm 46 preferably includes a first hook portion 47, and the second arm 48 preferably includes a second hook portion 49. In use, the first arm 46 and the second arm 48 preferably act together as a securing clip to attach and secure the connecting nozzle 20 to the angle iron 12 as shown in FIG. 6.

Referring again to FIG. 5, the connecting nozzle 20 preferably further includes a front nozzle connector 50 and a rear nozzle connector 52 which each preferably extend out from the central body portion 44. In this way the front nozzle connector 50 is preferably positioned to insert within a connecting hose 22 as discussed and shown above. Similarly, the rear nozzle connector 52 is preferably positioned to also connect to a length of connecting hose 22 so that individual pieces of connecting hose 22 are attached together and in liquid communication with each other. Optionally, hose clamps may preferably be used over the hose to further secure it to the nozzle.

The central main body 44 is preferably hollow to allow liquids to pass through the connecting nozzle 20. The central main body 44 preferably also includes a nozzle extension 54 which preferably is also in liquid communication with the hollow center of the central main body 44. In this way, as liquid is received from either end of the connecting nozzle 20, the liquid may proceed through the connecting nozzle 20 and into an attached hose. At the same time, the liquid may be provided under pressure through the nozzle extension 54 and into one or more attached sprinklers such as the drop sprinklers 43 shown and discussed with reference to FIG. 2 above. The attached drop sprinklers may preferably selectively control and direct the liquid onto an area of ground to be irrigated. Although shown as projecting from the top of the central main body 44, the nozzle extension 54 may alternatively extend from any portion of the central body 44. Additionally multiple nozzle extensions 54 may be used on a single central main body 44 so that liquid may be provided to multiple sprinkler heads directed to different areas of a given field and/or at different projecting angles for irrigating the same area of a given field.

According to a preferred embodiment, an internally threaded connection for the nozzle extension 54 may preferably be used to connect sprinkler hoses and the like. Alternatively, hose barbs and externally threaded connections may be used. According to a further alternative embodiment, the nozzle extension 54 may be oriented downward through a hole in the angle iron 12 thus eliminating the need for a U-pipe to orient sprinklers (i.e., sprinkler drops) below the span and closer to the crop.

With reference now to FIG. 6, an enlarged elevation view of a portion of the exemplary irrigation system 10 is provided. As shown, the front leg 28 and rear leg 30 are preferably oriented at opposing 45-degree angles so that they are substantially perpendicular to one another. The iron angle 12 is preferably angled downward so that the first wall 40 is substantially parallel to the rear leg 30 and the second wall 42 is substantially parallel to the front leg 28. In this configuration, the first wall 40 is preferably secured flush to the top surface of the rear leg 30 and the second wall 42 is preferably secured flush to the top surface of the front leg 28. As discussed above, the first and second walls 40, 42 are preferably secured to the rear and front legs 30, 28 (respectively) using multiple front and rear connecting bolts 36, 38. Alternatively, the components of the present invention may be connected together using a variety of securing mechanisms such as welds, adhesives, clips and/or the like and may further incorporate an under-truss as discussed above with reference to FIG. 3.

As shown, the central joint 45 of the angle iron 12 is preferably oriented downward to sit within the central point of intersection between the front and rear legs 28, 30. According to further embodiments, the same approach may preferably be used for trussing below the angle iron (shown in FIG. 3 above). In still further embodiments, the drive unit legs may be oriented at a narrower angle (60 degrees included vs the 90 degrees shown) by use of wedges between the angle iron 12 and legs 28, 30.

As additionally shown in FIG. 6, the connecting nozzle 20 is preferably secured to the angle iron 12 by having the first arm 46 (via first hook portion 47) extend around the first wall 40, while having the second arm 48 (via second hook portion 49) extend around the second wall 42. In this way, the first and second arms 46, 48 preferably act together as a securing clip to attach and secure the connecting nozzle 20 to the angle iron 12.

Figure 7:
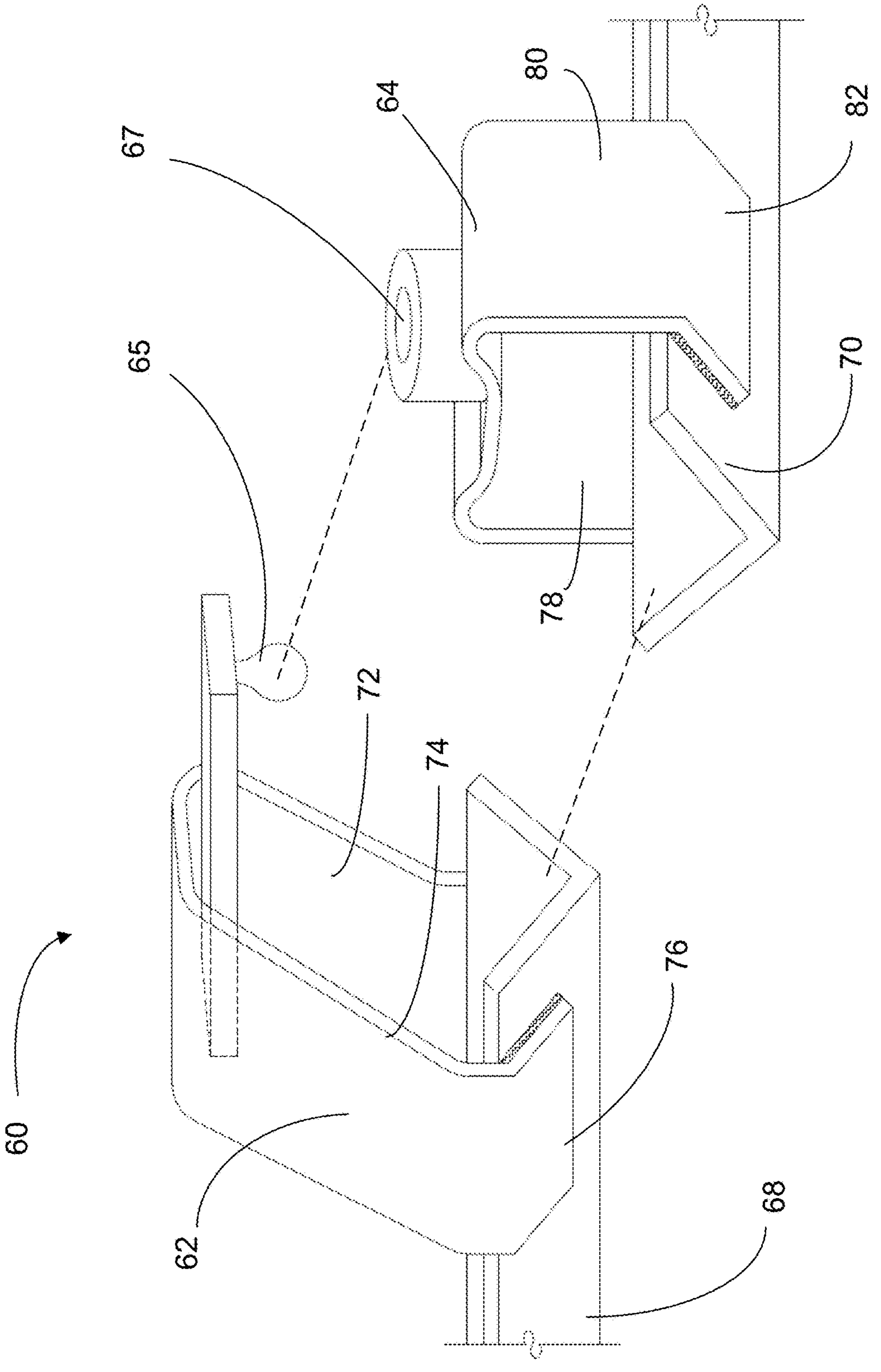
FIG. 7 shows a perspective view of an exemplary connecting assembly in accordance with a further preferred embodiment of the present invention.
Figure 8:
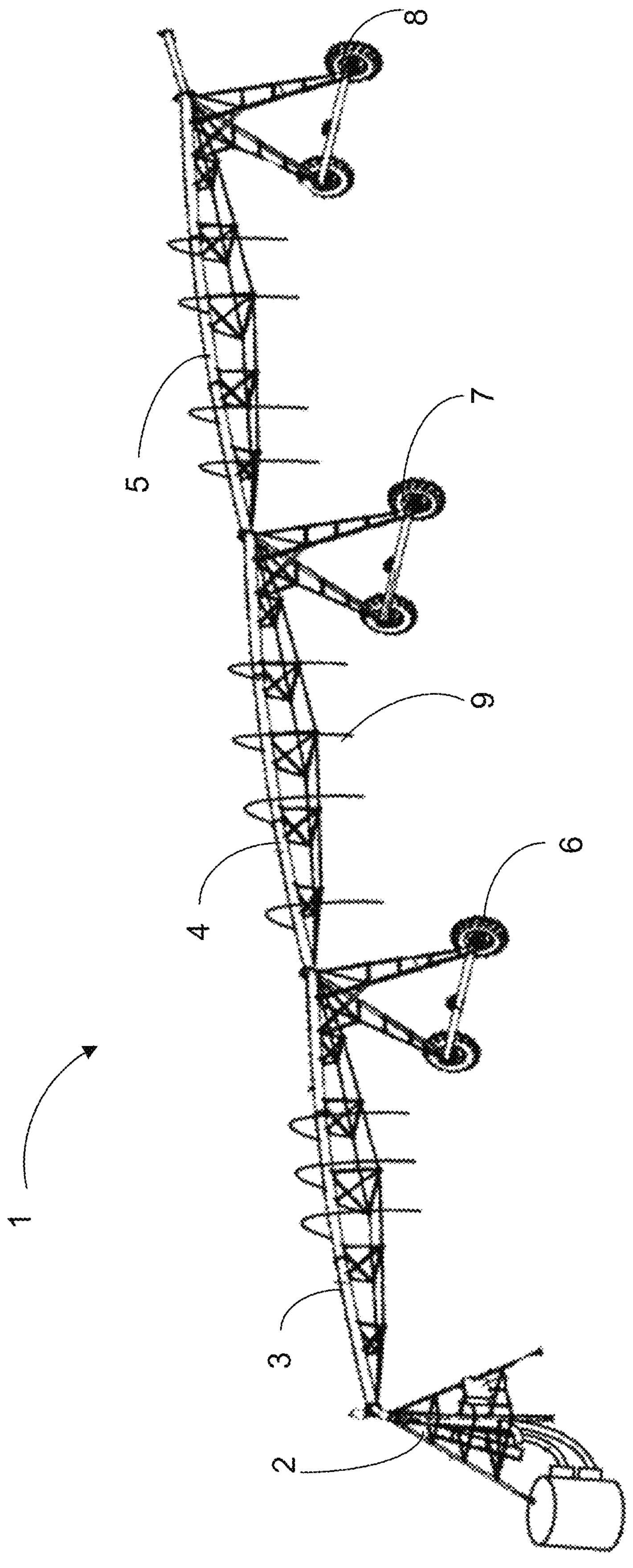
FIG. 8 (Prior Art)
FIG. 8 shows an irrigation system as known in the prior art.

With reference now to FIG. 7, an illustration of an exemplary ball and socket attachment assembly 60 in accordance with a first preferred embodiment is provided. As shown, ball attachment assembly 62 may preferably pair with a hitch attachment assembly 64 to connect a first angle iron section 68 and a second angle iron section 70. The same attachment assembly 60 may further be used between each section/span of angle iron sections 12 as discussed above.

The ball attachment assembly 62 may preferably include a ball 65 connected between a first arm 72 and a second arm 74. The ball attachment assembly 62 is preferably secured to the first angle iron section 68 via one or more hook surfaces 76. Other connection surfaces may be used without limitation. The hitch attachment assembly 64 preferably may include a center hitch 67 supported by a first arm 78 and a second arm 80. The hitch attachment assembly 64 may preferably be secured to the second angle iron section 70 via one or more hook surfaces 82. Other connection services may be used without limitation.

As shown, the ball 65 may preferably mate with and rotatably secure to the paired hitch 67. Such a connection may preferably be used to allow the irrigation system 10 to be manually moved and/or towed around a given field. The ball and hitch attachment assembly 60 may preferably be used to connect each angle iron section and connect adjacent spans at each drive unit. According to alternative preferred embodiments, the ball and hitch connection may leave a gap between angle irons which is preferably spanned by the water carrying hose.

Figure 9:
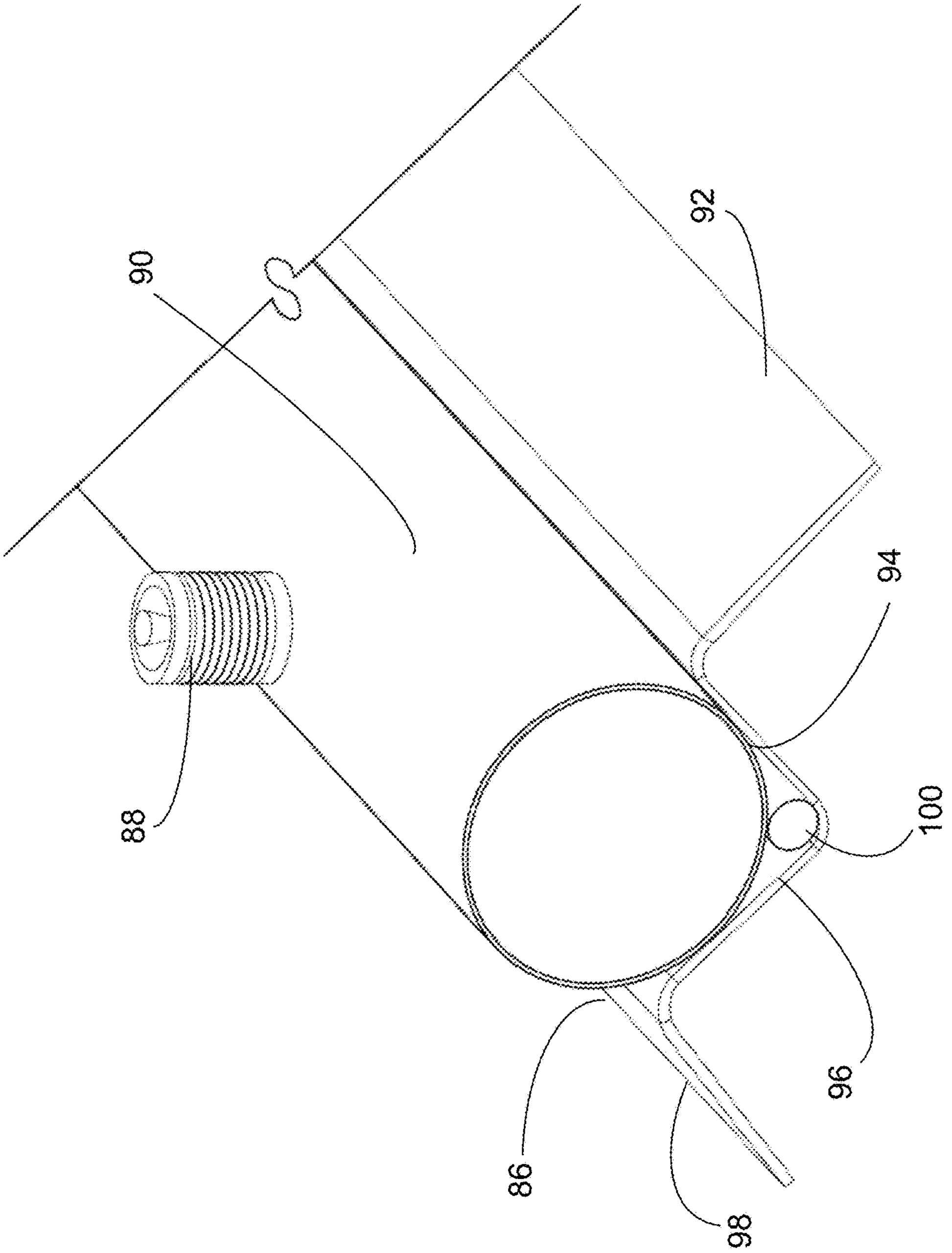
FIG. 9 shows a perspective view of an exemplary roll form beam assembly in accordance with a first alternative embodiment of the present invention.
Figure 10:
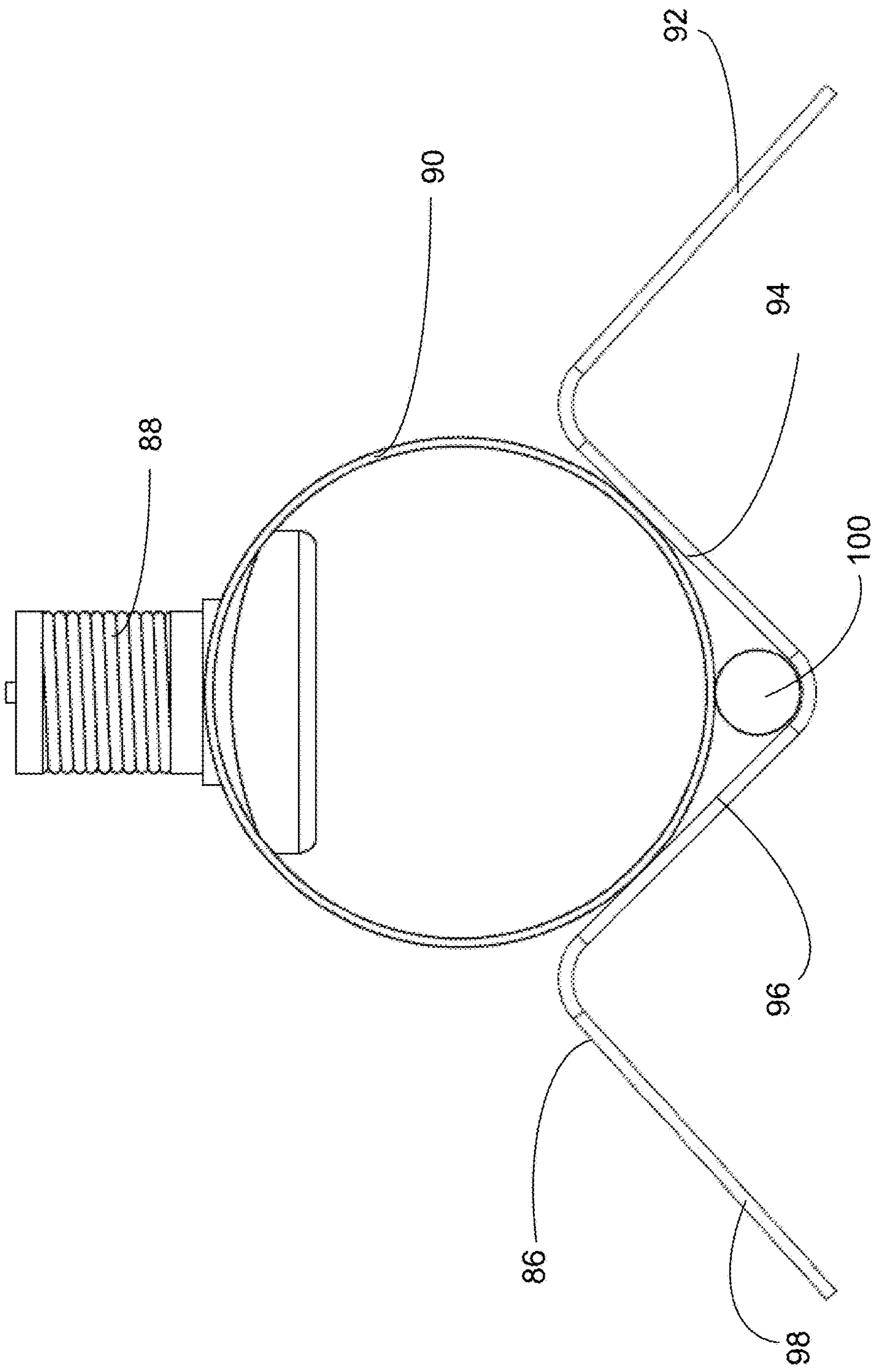
FIG. 10 shows a cross-sectional view of the exemplary roll form beam assembly shown in FIG. 9.

Referring now to FIGS. 9 and 10, a first alternative embodiment of the present invention in the form of a roll formed beam assembly for provisioning a lightweight field irrigation apparatus shall now be discussed. As shown in FIG. 9, the central angle iron 12 (discussed above and as shown in FIG. 4) may alternatively be formed and shaped as a roll form beam assembly 86 which includes a right outside truss diagonal 92, a right inside truss diagonal 94, a left inside truss diagonal 96, and a left outside truss diagonal 98. As shown in FIGS. 9 and 10, the right inside truss diagonal 94 and left inside truss diagonal 96 may preferably be angled to form a central V-shaped channel which supports the central hose 90 and span cable 100 as shown. As further shown, a right outside truss diagonal 92 may preferably be formed to extend from the right inside truss diagonal 94 at approximately a 90° angle. Similarly, a left outside truss diagonal 98 may preferably be formed to extend from the left inside truss diagonal 96 at approximately a 90° angle.

Figure 16:
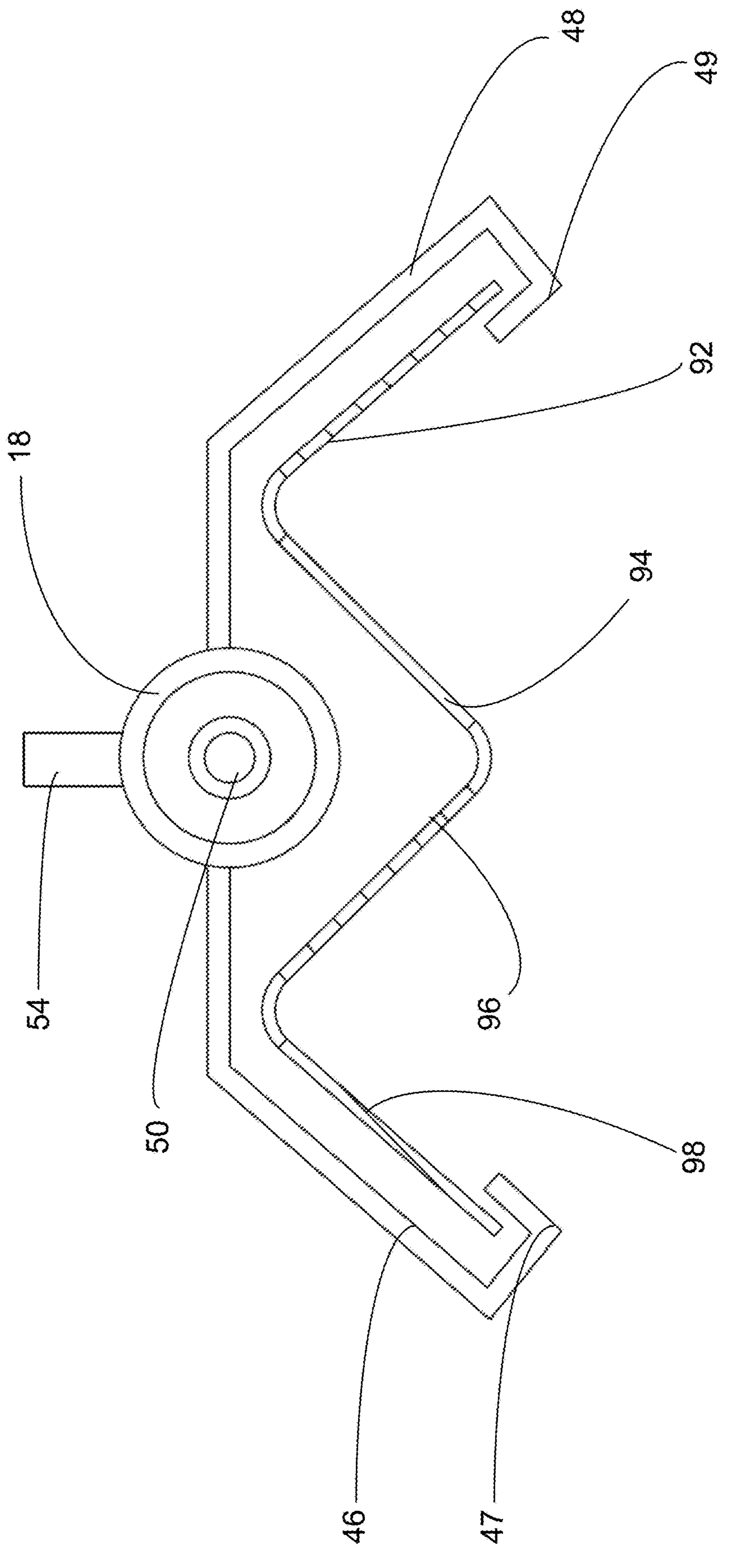
FIG. 16 is a cross-sectional view of an exemplary connecting nozzle attached to a roll form beam assembly of the present invention.

FIG. 16 is a cross-sectional view of an exemplary connecting nozzle 18 attached to a roll form beam assembly 86 of the present invention. As shown in FIG. 16, the connecting nozzles 18, 20 of the present invention may preferably be sized and fitted to attach to the roll form beam assembly 86. Specifically, the various embodiments of the connecting nozzles 18, 20 discussed above may be formed so that the first hook portion 47 of the first arm 46 may extend around the left outside truss diagonal 98, and the second hook portion 49 of the second arm 48 may extend around the right outside truss diagonal 92. In this way, the first hook portion 47 and the second hook portion 49 may act together as a securing clip to attach and secure the connecting nozzle 18, 20 to the roll form beam assembly 86.

Figure 11A:
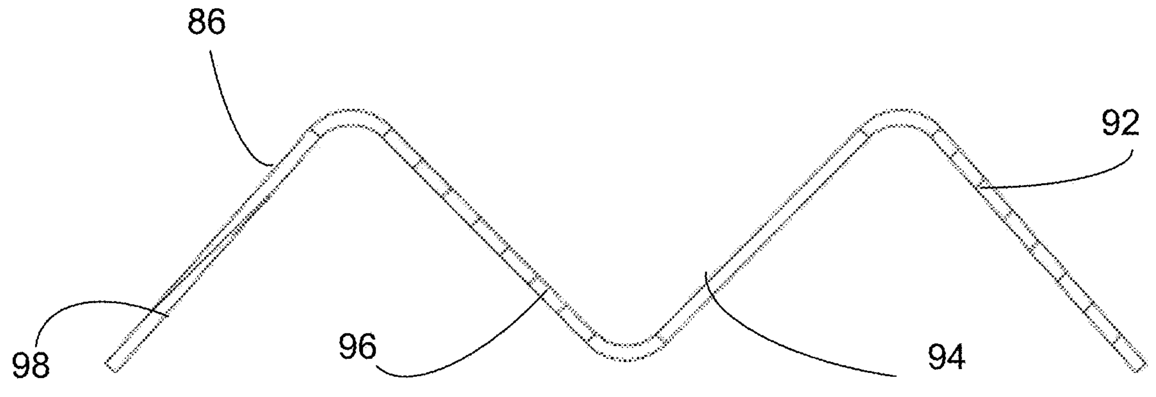
FIGS. 11A and 11B are alternative cross-sectional views of the exemplary roll form beam assembly shown in FIGS. 9 and 10
Figure 11B:
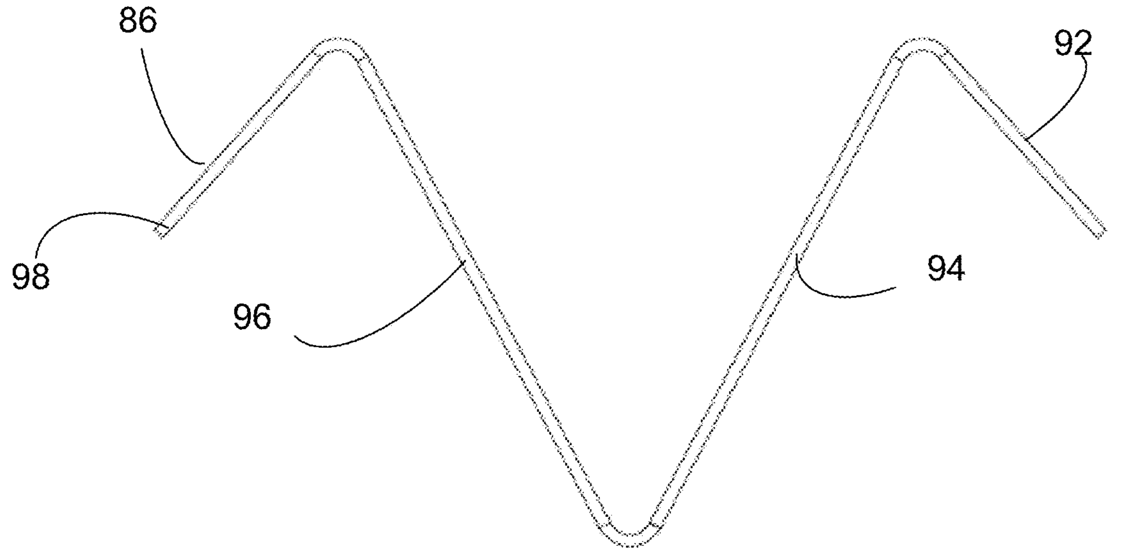

FIGS. 11A and 11B are alternative cross-sectional views of the exemplary roll form beam assembly shown in FIGS. 9 and 10. As shown in FIGS. 11A and 11B, the respective lengths of the right inside truss diagonal 94 and left inside truss diagonal 96 may be adjusted and lengthened to increase the depth and dimensions of the central V-shaped channel of the roll form beam assembly 86.

Figure 12:
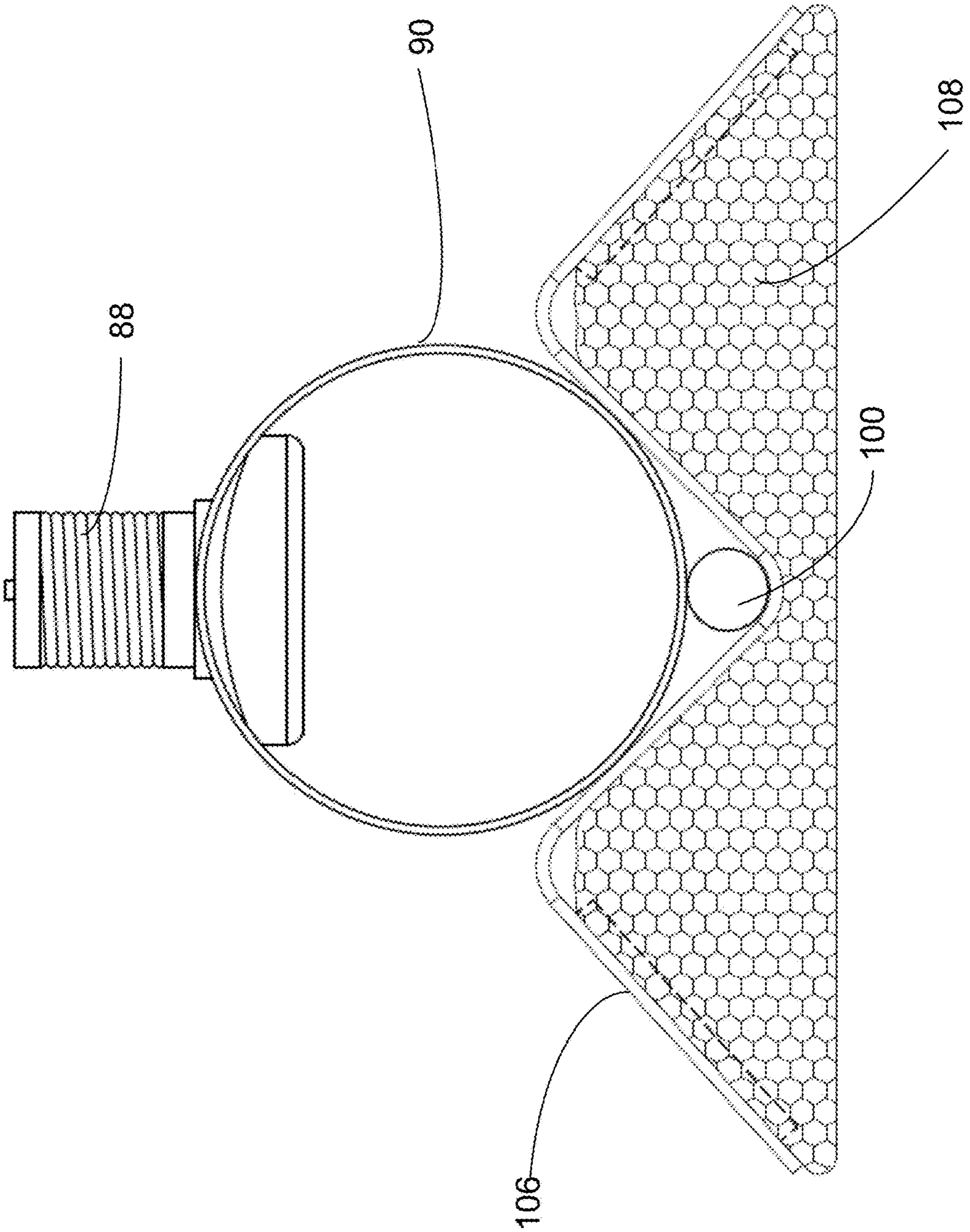
FIG. 12 is a cross-sectional view of the exemplary roll form beam assembly shown in FIG. 9 with interior bracing material.

FIG. 12 is a cross-sectional view of the exemplary roll form beam assembly shown in FIG. 9 with interior bracing material. As shown in FIG. 12, the central role form beam 106 of the present invention may preferably include a brace 108 which is insertable within the underside surface of the role form beam 106. According to alternative embodiments the brace 108 may be formed of a variety of materials including metals, mesh wiring, spray foam, shaped plastics (e.g. PVC, LDPE, HDPE) and the like.

Figure 13:
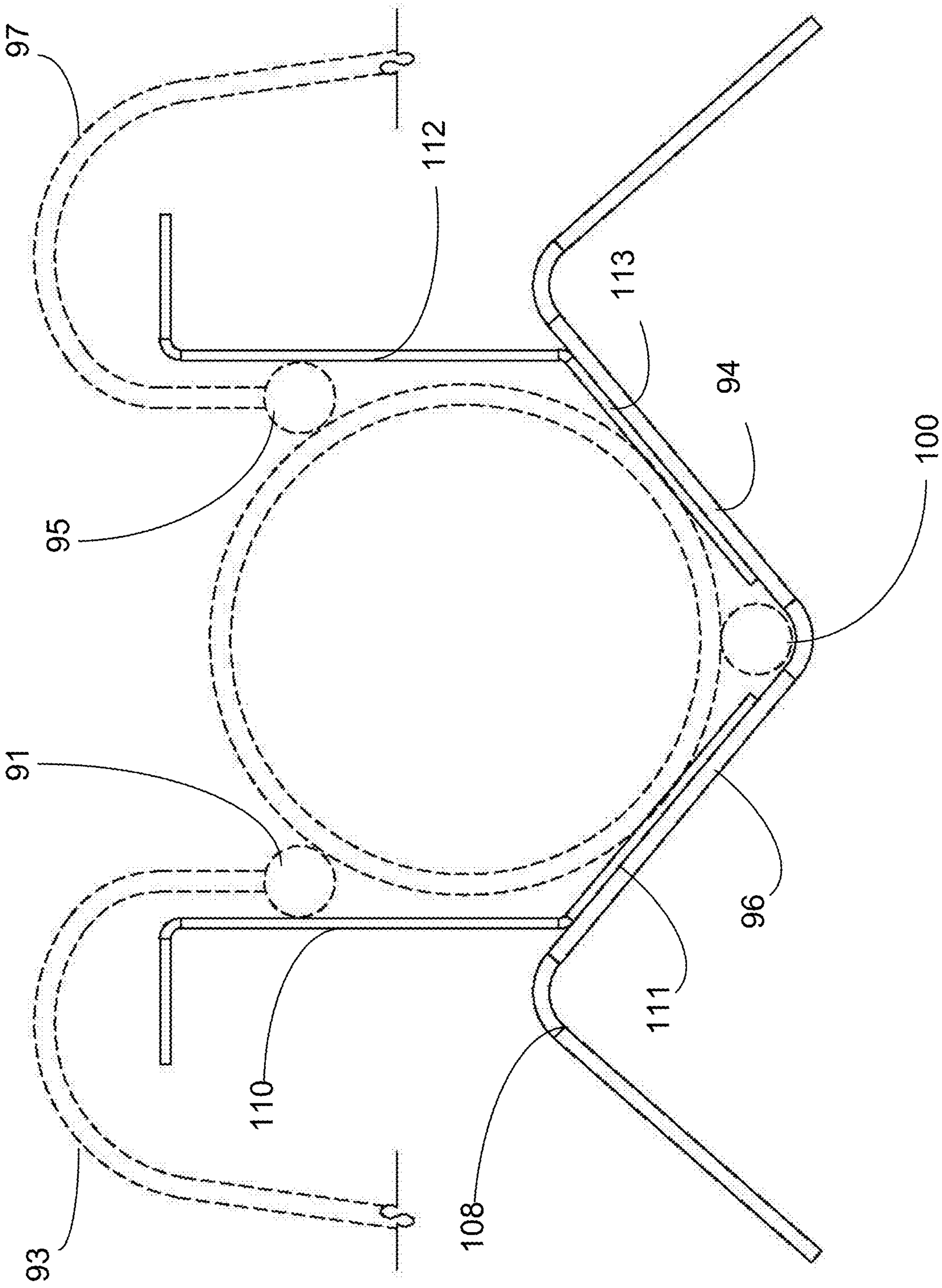
FIG. 13 is a cross-sectional view of the exemplary roll form beam assembly shown in FIG. 9 with attached bracing walls.

FIG. 13 is a cross-sectional view of the exemplary roll form beam assembly shown in FIG. 9 with attached bracing walls. As shown in FIG. 13, the roll form beam assembly 108 of the present invention may in some embodiments include a left side brace wall 110 and a right side brace wall 112. The brace walls 110, 112 may preferably be formed of metals (e.g. steel) and may be attached via welds or alternatively via adhesives, screws or the like. As shown, the left side brace wall 110 may include a brace wall foot portion 111 which is parallel to the left inside truss diagonal 96. Likewise, the right side brace wall 112 may include a brace wall foot portion 113 which is parallel to the right inside truss diagonal 94.

As further shown in FIG. 13, the central roll form beam assembly of the present invention may preferably further include one or more additional lines running within the central channel of the present invention. Preferably, the one or more additional lines may include for example a span cable 100 as discussed above, for providing power and/or communications along the central roll form beam assembly. As further shown in FIG. 13, the assembly of the present invention may further accommodate and include one or more additional lines dedicated to chemigation, fertigation, as well as other additional lines and tubes such as communication lines (e.g., coaxial cables, ethernet and fiber optic lines) and the like. In the example shown in FIG. 13, an exemplary chemigation line 91 may run along the main span and may include one or more drop lines 93 for dispensing chemicals through an end nozzle, sprayer or the like (not shown). Similarly, the assembly may include a fertigation line 95 which may include one or more drop lines 97 for dispensing fertilizer through an end nozzle, sprayer or the like (not shown).

Figure 14:
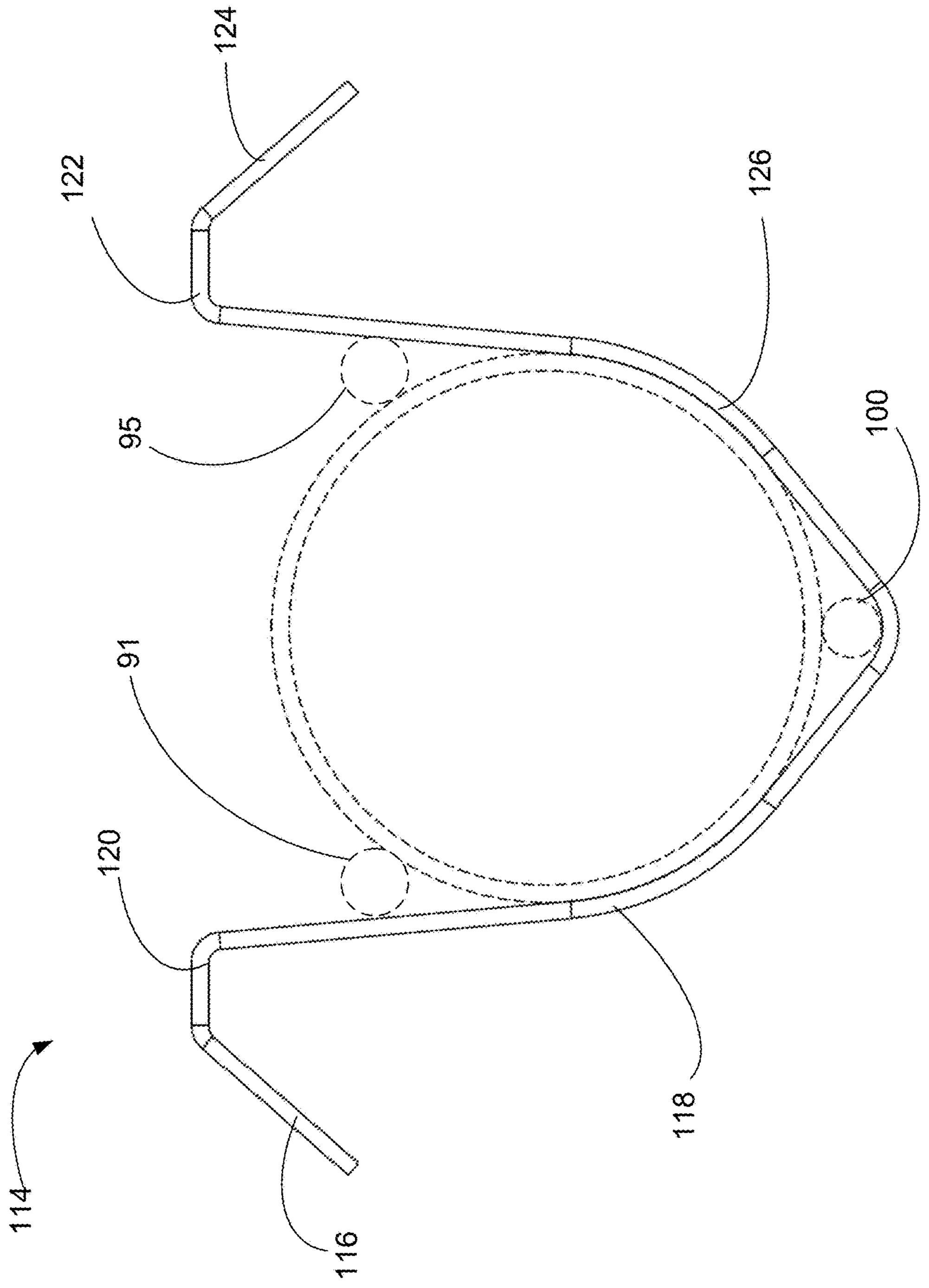
FIG. 14 is a cross-sectional view of a second alternative embodiment of the roll form beam assembly of the present invention.

FIG. 14 is a cross-sectional view of a second alternative embodiment of the roll form beam assembly of the present invention. As shown in FIG. 14, the roll form wall may include a left outside truss diagonal 116, a left inside truss diagonal 118, a left top surface 120, a right inside truss diagonal 126, a right outside truss diagonal 124, and a right top surface 122. The chemigation line 91, fertigation line 95 and span line 100 are further shown.

Figure 15:
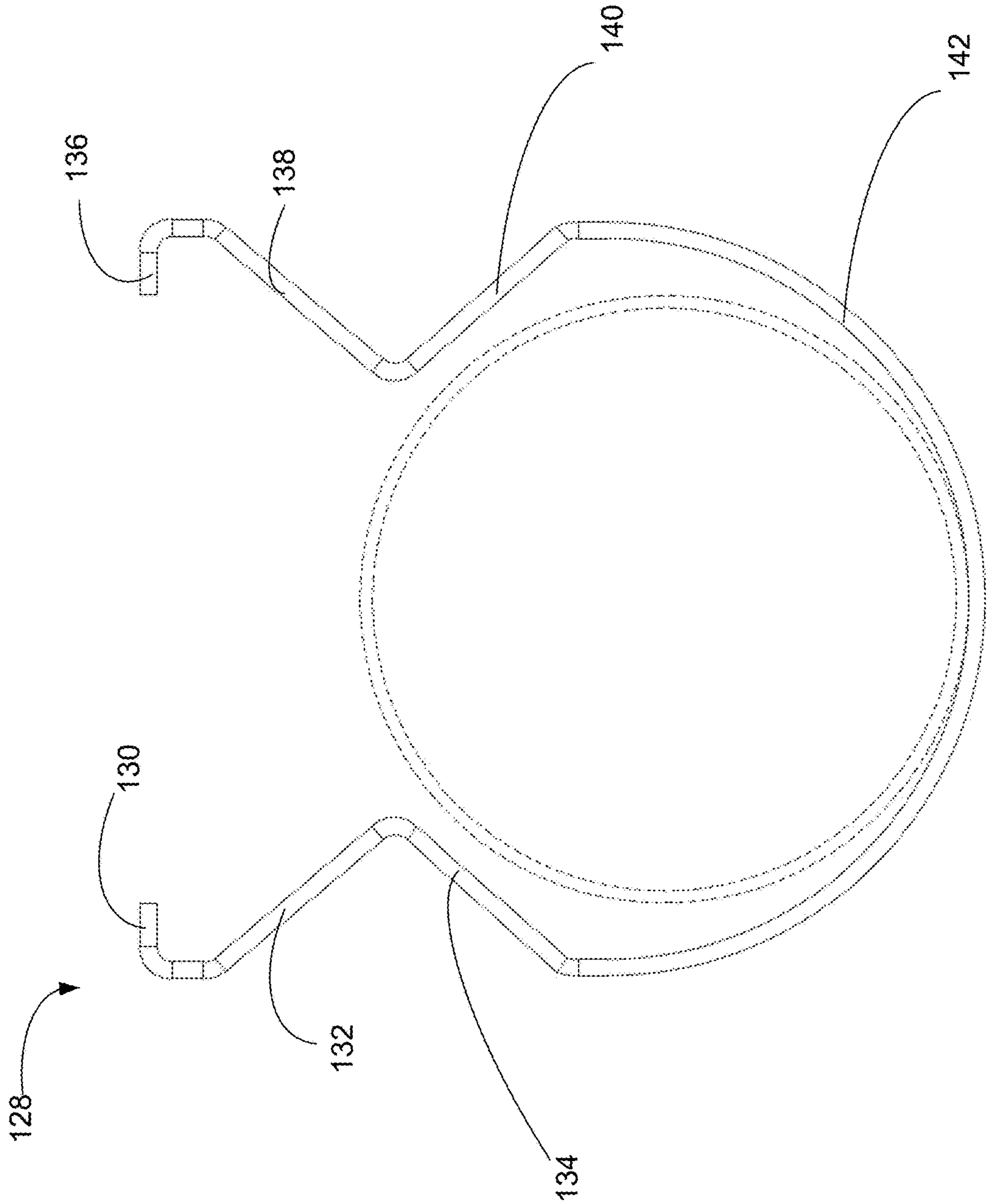
FIG. 15 is a cross-sectional view of a third alternative embodiment of the roll form beam assembly of the present invention.

FIG. 15 is a cross-sectional view of a third alternative embodiment of the roll form beam assembly of the present invention. As shown in FIG. 15, the roll form wall 128 may include a left top surface 130, a left outside truss diagonal 132, a left inside truss diagonal 134, a right top surface 136, a right outside truss diagonal 138, right inside truss diagonal 140, and a central curved surface 142 which preferably may connect the left inside truss diagonal 134 and the right inside truss diagonal 140.

Figure 17:
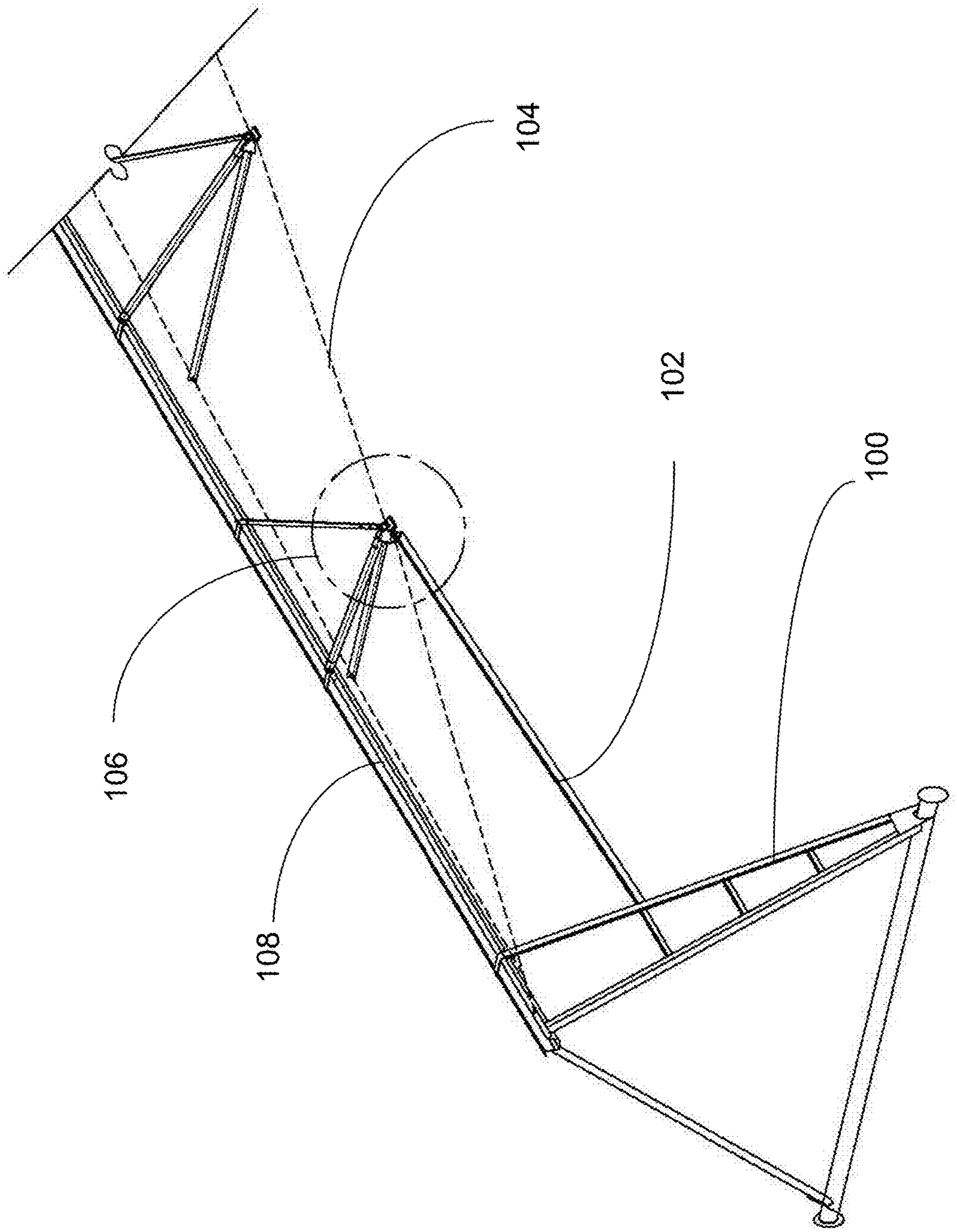
FIG. 17 is a perspective view of an exemplary truss support system for use with aspects of the present invention.
Figure 18:
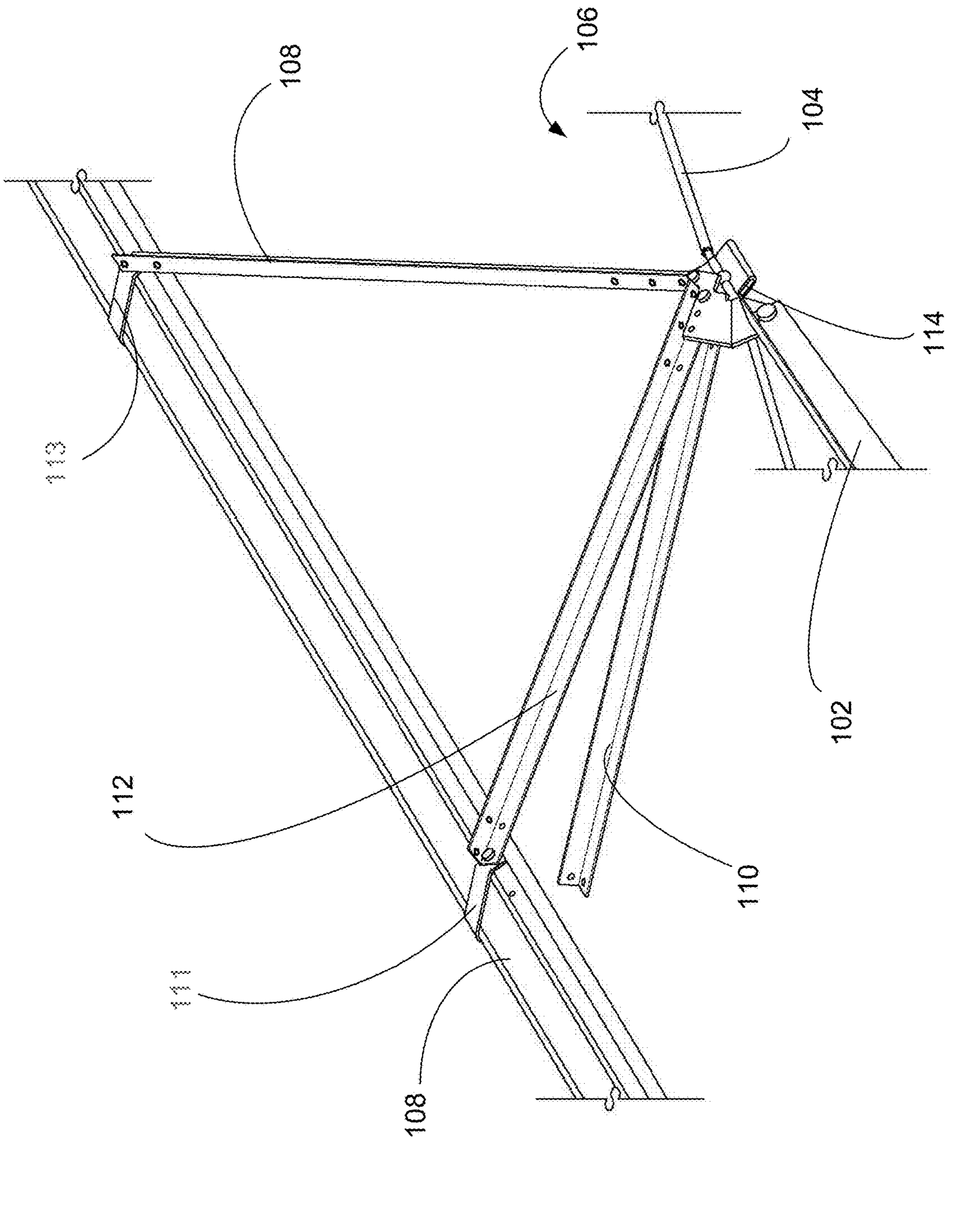
FIG. 18 is an enlarged view of a section of the exemplary truss support system shown in FIG. 17.
Figure 19:
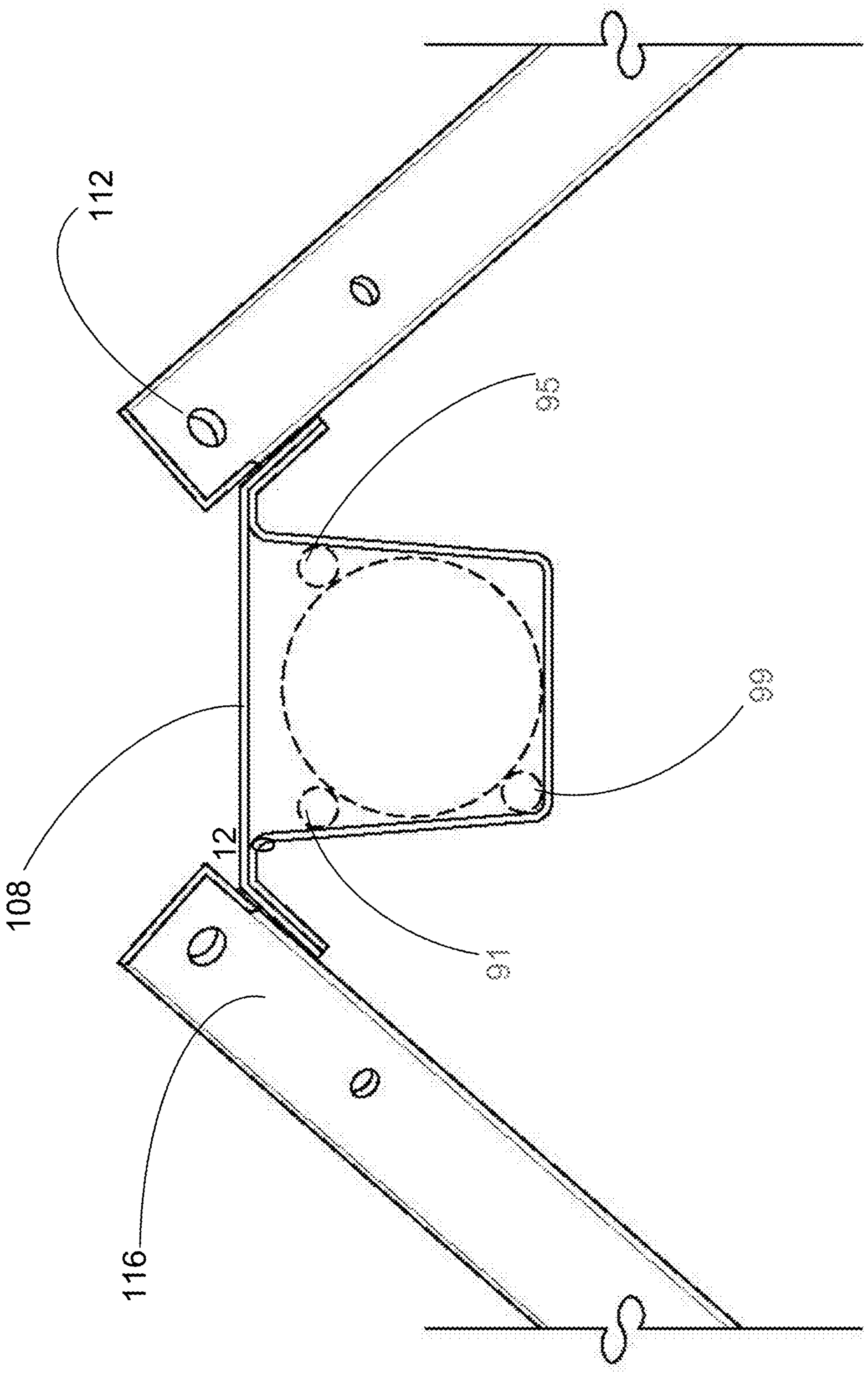
FIG. 19 is a cross-sectional view of the exemplary truss support system of the present invention.

Referring now to FIGS. 17-20, an exemplary truss support system for use with the present invention shall be discussed. Referring first to FIG. 17, a first perspective view of an exemplary truss support system is provided. In FIG. 17, a single side of the truss support system is shown and the other side elements are omitted to provide a clearer illustration of the truss support system. In use, both the right and left hand sides of the truss support system may preferably mirror each other to provide full support to the central roll formed beam assembly 108. As shown in FIG. 17, the truss support assembly of the present invention may extend from one or more drive towers 100. As shown, a stiffening bar 102 may extend from a first drive tower 100 and connect to a truss brace assembly 106 which further may connect to one or more truss rods 104. FIG. 18 provides an enlarged view of the truss brace assembly 106 as indicated in FIG. 17. As shown in FIG. 18, the truss brace assembly 106 may preferably connect to the tower stiffening bar 102 at a connection point 114 via a bolt or the like. As further shown, the truss brace assembly 106 may preferably further include a lateral strut 110, an angled strut 112 and a vertical strut 108 which each directly or indirectly may provide support to the central roll formed span assembly 108. FIG. 19 provides a cross-sectional view of the exemplary truss support system with the mirrored angled span struts 112, 116 provided. As shown, the angled span struts 112, 116 may preferably extend from the connection point 114 and connect to sections of the roll formed span assembly 108.

Figure 20:
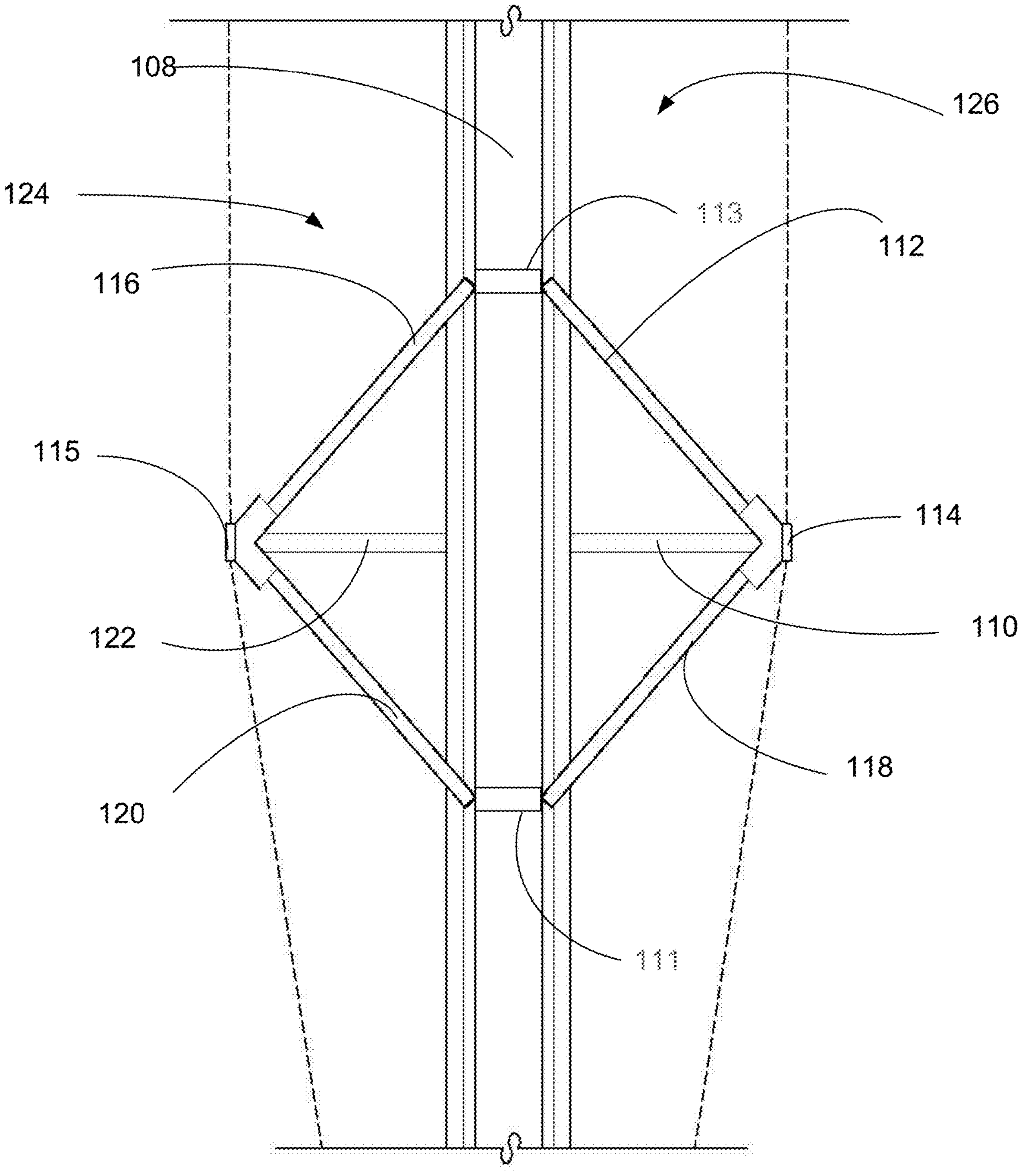
FIG. 20 is a top down view of an exemplary section of the truss support system of the present invention.

Referring now to FIG. 20, a top down view of an exemplary section of the truss support system of the present invention is provided showing each mirrored section (left 124 and right 126) of the truss support assembly of the present invention. As shown, a first section 124 may include a first angled span strut 116, a second angled span strut 120, a central connection point 115 and a lateral span strut 122. As further shown, a second section 126 may include a first angled span strut 112, a second angled span strut 118, a central connection point 114 and a lateral span strut 110. Although obscured from view, the lateral span trusses 110 and 122 may preferably be connected together under the span assembly 108.

The examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

The scope of the present invention should be determined not by the embodiments illustrated, but by the appended claims and their legal equivalents.

What is claimed is:

1. An irrigation span assembly comprising:

a beam assembly extending longitudinally along the irrigation span, the beam assembly comprising:
- a right outside truss diagonal;
- a right inside truss diagonal;
- a left inside truss diagonal; and
- a left outside truss diagonal, wherein the right inside truss diagonal and the left inside truss diagonal are joined to define a longitudinal V-shaped channel;
- a flexible hose extending longitudinally within the longitudinal V-shaped channel; and
- at least one nozzle connector positioned along the beam assembly, the at least one nozzle connector comprising:
- a hollow central body;
- a front connection insert connected to a first portion of the flexible hose;
- a rear connection insert connected to a second portion of the flexible hose;
- a nozzle extension in fluid communication with the hollow central body;
- a first arm extending from the hollow central body and terminating in a first hook portion; and
- a second arm extending from the hollow central body and terminating in a second hook portion, wherein the first hook portion engages the left outside truss diagonal and the second hook portion engages the right outside truss diagonal on opposite sides of the longitudinal V-shaped channel to support the nozzle connector directly from the beam assembly while the flexible hose extends within the longitudinal V-shaped channel;

wherein the first hook portion and the second hook portion cooperate to detachably secure the nozzle connector to the beam assembly without a separate mounting bracket;

wherein the hollow central body fluidly connects the first portion of the flexible hose and the second portion of the flexible hose; and wherein irrigation liquid received through the flexible hose is discharged through the nozzle extension.

2. The irrigation span assembly of claim 1, wherein the longitudinal V-shaped channel supports the flexible hose.

3. The irrigation span assembly of claim 1, wherein the longitudinal V-shaped channel further supports a span cable.

4. The irrigation span assembly of claim 1, wherein the beam assembly is formed from a single continuous sheet of material.

5. The irrigation span assembly of claim 4, wherein the beam assembly is roll formed.

6. The irrigation span assembly of claim 1, wherein the first hook portion and the second hook portion cooperate to form a snap-fit connection that removably secures the nozzle connector to the beam assembly.

7. The irrigation span assembly of claim 1, wherein the hollow central body is formed as a one-piece molded polymeric body.

8. The irrigation span assembly of claim 7, wherein the one-piece molded polymeric body comprises high-density polyethylene.

9. The irrigation span assembly of claim 1, wherein the nozzle extension comprises an internally threaded connection.

10. The irrigation span assembly of claim 1, wherein the beam assembly further comprises an internal brace positioned within the beam assembly.

11. The irrigation span assembly of claim 1, wherein the beam assembly further comprises a left side brace wall and a right side brace wall.

12. The irrigation span assembly of claim 1, further comprising an under-truss assembly supporting the beam assembly.

13. The irrigation span assembly of claim 1, further comprising a ball attachment assembly configured to connect the beam assembly to an adjacent beam assembly.

14. The irrigation span assembly of claim 13, wherein the ball attachment assembly comprises:

a ball connected between a first arm and a second arm; and a hitch configured to receive the ball.

15. The irrigation span assembly of claim 1, wherein the flexible hose comprises a material selected from the group consisting of high-density polyethylene tubing, reinforced fabric hose, fiber reinforced plastic hose, polyvinyl chloride hose, and rubber hose.

* * * * *